United States Patent
Zhang et al.

(10) Patent No.: US 11,442,765 B1
(45) Date of Patent: Sep. 13, 2022

(54) IDENTIFYING DEPENDENCIES FOR PROCESSES FOR AUTOMATED CONTAINERIZATION

(71) Applicant: Amazon Technologies, Inc., Seattle, WA (US)

(72) Inventors: Jiangtao Zhang, Pleasanton, CA (US); Sriram Venkatadri, Santa Clara, CA (US); Boyu Wang, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 16/574,850

(22) Filed: Sep. 18, 2019

(51) Int. Cl.
| | |
|---|---|
| *G06F 11/30* | (2006.01) |
| *G06F 11/34* | (2006.01) |
| *G06F 8/61* | (2018.01) |
| *G06F 9/455* | (2018.01) |
| *G06F 9/30* | (2018.01) |
| *G06F 8/36* | (2018.01) |
| *G06F 16/11* | (2019.01) |

(52) U.S. Cl.
CPC ............ *G06F 9/45558* (2013.01); *G06F 8/36* (2013.01); *G06F 8/61* (2013.01); *G06F 9/30145* (2013.01); *G06F 11/301* (2013.01); *G06F 11/3024* (2013.01); *G06F 11/3495* (2013.01); *G06F 16/128* (2019.01); *G06F 2009/45562* (2013.01)

(58) Field of Classification Search
CPC .......... G06F 9/45558; G06F 8/36; G06F 8/61; G06F 9/30145; G06F 11/301; G06F 11/3024; G06F 11/3495; G06F 16/128; G06F 2009/45562
See application file for complete search history.

(56) References Cited

U.S. PATENT DOCUMENTS

| | | | | |
|---|---|---|---|---|
| 8,171,482 B1 * | 5/2012 | Vlaovic | ............. | G06F 9/44521 718/1 |
| 8,856,809 B2 | 10/2014 | Curbera et al. | | |

(Continued)

FOREIGN PATENT DOCUMENTS

| | | |
|---|---|---|
| CN | 103399734 A | 11/2013 |
| CN | 109246251 A | 1/2019 |
| JP | 2020187733 A | 11/2020 |

OTHER PUBLICATIONS

Liu, Pinchao, et al. "A Toolset for Detecting Containerized Application's Dependencies in CaaS Clouds." 2018 IEEE 11th International Conference on Cloud Computing (Cloud). IEEE, 2018. (Year: 2018).*

(Continued)

*Primary Examiner* — Matthew J Brophy
(74) *Attorney, Agent, or Firm* — Lee & Hayes, P.C.

(57) ABSTRACT

This disclosure describes techniques implemented partly by a service provider network for containerizing applications. In an example, the techniques may include determining one or more processes to be included in a containerized version of an application, preparing and initializing a sandbox including at least executable files of the one or more determined processes, monitoring the execution of a particular process of the one or more determined processes in the sandbox to determine one or more dependencies of the particular process, and selecting the one or more dependencies of the particular process to be components of the containerized version of the application.

20 Claims, 7 Drawing Sheets

(56) References Cited

U.S. PATENT DOCUMENTS

| | | | |
|---|---|---|---|
| 9,122,562 B1* | 9/2015 | Stickle | G06F 9/5077 |
| 9,971,622 B2* | 5/2018 | Bjorkengren | G06F 9/45558 |
| 10,007,509 B1* | 6/2018 | Qureshi | G06F 8/656 |
| 10,146,522 B1 | 12/2018 | Sundresh | |
| 10,572,294 B1* | 2/2020 | Chawda | G06F 9/44505 |
| 10,871,950 B2 | 12/2020 | De Smet | |
| 2011/0088038 A1 | 4/2011 | Kruglick | |
| 2012/0290950 A1 | 11/2012 | Rapaport et al. | |
| 2014/0115285 A1* | 4/2014 | Arcese | G06F 9/45533 711/162 |
| 2014/0172782 A1 | 6/2014 | Schuenzel et al. | |
| 2015/0113545 A1 | 4/2015 | Holt | |
| 2015/0379287 A1* | 12/2015 | Mathur | G06F 21/6209 726/27 |
| 2016/0330132 A1 | 11/2016 | Rickey | |
| 2016/0350081 A1* | 12/2016 | Kumar | G06F 8/30 |
| 2016/0378525 A1* | 12/2016 | Bjorkengren | G06F 9/4856 718/1 |
| 2017/0052772 A1* | 2/2017 | Chen | G06F 9/45558 |
| 2018/0025160 A1* | 1/2018 | Hwang | G06F 9/455 726/25 |
| 2018/0167480 A1 | 6/2018 | Jain | |
| 2018/0373505 A1 | 12/2018 | Engquist et al. | |
| 2019/0042320 A1 | 2/2019 | Prince et al. | |
| 2019/0087118 A1* | 3/2019 | Makin | G06F 9/4856 |
| 2020/0019388 A1 | 1/2020 | Jaeger et al. | |
| 2020/0117576 A1* | 4/2020 | Karukuri | G06F 11/3466 |
| 2020/0249936 A1 | 8/2020 | Barfield, Jr. | |
| 2020/0272440 A1* | 8/2020 | Burgazzoli | G06F 8/433 |

OTHER PUBLICATIONS

Office Action for U.S. Appl. No. 16/574,782, dated Oct. 7, 2020, Zhang, "Identifying Cooperating Processes for Automated Containerization", 26 Pages.

Ducasse et al., "Pragmas: Literal Messages as Powerful Method Annotations," ACM, Aug. 2016, 9 pg.

Office Action for U.S. Appl. No. 16/574,782, dated May 26, 2021, Zhang, "Identifying Cooperating Processes for Automated Containerization", 30 pages.

Office Action for U.S. Appl. No. 16/574,782, dated Nov. 2, 2021, Zhang, "Identifying Cooperating Processes for Automated Containerization", 32 pages.

Office Action for U.S. Appl. No. 16/884,865, dated Mar. 30, 2022, Wang, "Annotation Based Automated Containerization", 22 pages.

Santos et al., "Design annotations to improve API discoverability," Elsevier, Apr. 2017, 17pg.

Tryfonos et al., "Unicorn Libraries, IDE Plugin, Container Packaging and Deployment Toolset Early Release Deliverable D2.1," Mar. 2018, 75pg.

* cited by examiner

| Category | Factor | Weight | Yes | No | N/A |
|---|---|---|---|---|---|
| Multiple Local Processes | Parent-Child or Sibling | 1 | ☒ | ☐ | ☐ |
| | Same UserID or GroupID | 1 | ☐ | ☒ | ☐ |
| | Same Processor Group and Session | 2 | ☒ | ☐ | ☐ |
| | IPC | 5 | ☒ | ☐ | ☐ |
| | Signal (SIGUSR1) | 1 | ☐ | ☒ | ☐ |
| | Domain Socket | 5 | ☐ | ☐ | ☐ |
| | Same iNode File Access | 2 | ☒ | ☐ | ☐ |
| | Same cGroup | 5 | ☒ | ☐ | ☐ |
| Distributed Processes | Long Live TCP connection | 5 | ☐ | ☐ | ☐ |
| | UDP Communication | 2 | ☒ | ☐ | ☐ |
| | Port Number same | 3 | ☒ | ☐ | ☐ |
| | Exe File Same | 4 | ☒ | ☐ | ☐ |
| | Same Environment Variable | 1 | ☒ | ☐ | ☐ |

IDENTIFYING DEPENDENCIES FOR PROCESSES FOR AUTOMATED CONTAINERIZATION

BACKGROUND

Service provider networks offer network-based services to fulfill users' computing-service needs without the users having to invest in and maintain computing infrastructure required to implement the services. These service provider networks may provide network-based computing resources on an as-needed basis. For example, a service provider network may permit users to purchase and utilize computing resources such as virtual machine ("VM") instances, data storage resources, database resources, networking resources, network services, and other types of computing resources. Users may configure the computing resources provided by a service provider network to implement desired functionality, such as to provide a network-based application or another type of functionality.

Many users continue to maintain legacy software applications that have been built and over many years. These legacy software applications might be built, configured, and deployed using different processes, which may require a significant amount of operational burden and may possibly hinder and/or prevent the customer from developing new business. Also, many of these legacy software applications are executing on systems that are no longer supported or are nearing an end of their support and, as a result, need to be re-platformed in the near future.

However, migrating legacy applications from on-premise systems to computing resources provided by a service provider network can be complex, operationally intensive, and time-consuming. For example, in order to utilize the computing resources provided by a service provider network, the user may need to prepare and provide a version of the legacy software applications currently running on the user's on-premise systems that is self-contained (referred to herein as containerized). For example, the legacy software applications may be containerized into container images and task definitions and scheduled to run in the computing resources of the service provider network. In some examples, such a containerized application may allow the service provider network to scale up or down the computing resources allocated to the user's application (e.g. by increasing or decreasing the number of VM instances running the containerized application). Preparing for such a version may be beyond the capabilities or resources of users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates an example questionnaire that may be presented to a user via a console to obtain information for determining cooperating processes during containerization of an application.

DETAILED DESCRIPTION

Figure 1:
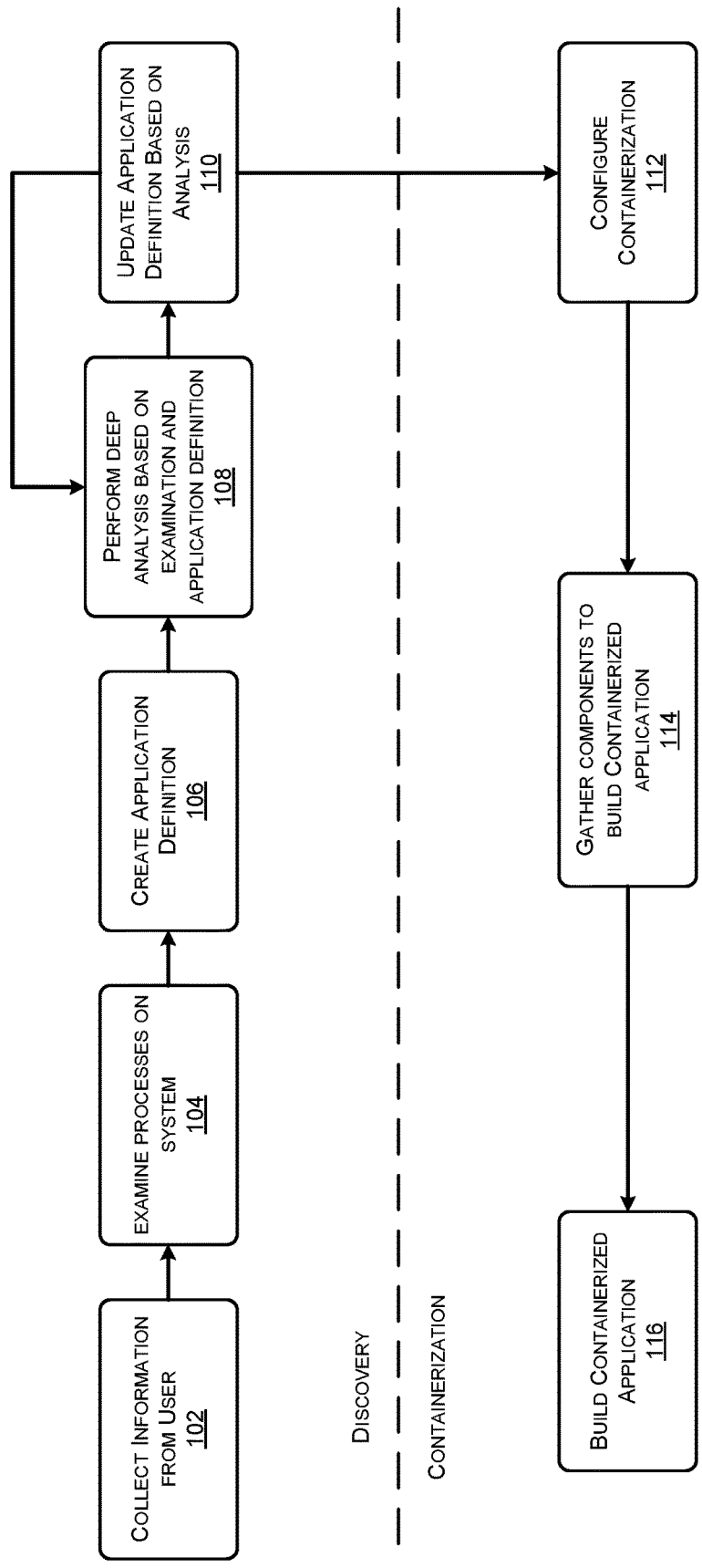
FIG. 1 illustrates a flow diagram of an example process performed by a service provider network to containerize an application.

This disclosure describes, at least in part, techniques for providing automated, partially automated, or assisted containerization of applications. More particularly, a containerization service (CS) described herein may provide a more efficient and faster way for users of service provider networks to containerize legacy applications such that the legacy applications are seamlessly deployment to the service provider network.

Service provider networks, such as cloud-based service provider networks, may provide network-based computing resources on an as-needed basis. A service provider network, "provider network" or "cloud," may refer to a large pool of accessible virtualized computing resources (such as compute, storage, and networking resources, applications, and services). The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in service provider data centers that provide those services.

For example, a service provider network may permit users to purchase and utilize scalable computing resources such as virtual machine ("VM") instances, data storage resources, database resources, networking resources, network services, and other types of computing resources. Generally, users register for users accounts with the service provider network and purchase, or otherwise reserve, a number of machine instances required to serve (e.g., process, execute, etc.) a maximum number of concurrent requests. For example, a user may request that the service provider network reserve or allocate VM instances to be readily available to be spun up, or called, to serve a maximum number of concurrent requests that are served at least partially at a same time. While the techniques described herein are equally applicable to any computing instance, machine instance, or computing resource, the techniques are herein described with reference to VM instances executing containerized applications (referred to hereafter as containers). Non-limiting examples of service provider networks include Amazon's Elastic Container Service (ECS) and Elastic Kubernetes Service (EKS).

These service provider networks may provide containerization services which may be improved using the techniques disclosed herein for providing automated, partially automated, or assisted containerization of applications. For example, legacy software applications may be containerized into container images and task definitions and scheduled to run in ECS or EKS managed clusters (including one or more VM instances). In some embodiments, the containerized application may not run on the VM directly. For example, a container layer (such as Docker) may be provided between the application and VM operating system. As mentioned above, deploying a containerized application on a service provider network such as ECS and EKS may allow the service provider network to scale up or down the computing resources allocated to the user's application (e.g. by increasing or decreasing the number of VM instances running the containerized application).

In general, a process is an instance of a computer program that is being executed by one or many threads. It contains the program code and its activity. Depending on the operating system (OS), a process may be made up of multiple threads of execution that execute instructions concurrently. As such, while a computer application is a passive collection of instructions, a process is the actual execution of those instructions. Several processes may be associated with the same application. For example, opening up several instances of the same program often results in more than one process being executed. In another example, a process may spawn a child process to perform a subtask on behalf of the parent process (e.g. the process spawning the child process).

A container, as referred to herein, packages code and all its dependencies so that an application (also referred to as a task) can run quickly and reliably from one computing environment to another. A container image is a standalone, executable package of software that includes everything needed to run an application: code, runtime, system tools, system libraries, and settings. In the case of an application that includes multiple related processes, such as parent-child processes, the container may include everything needed to reach of the related processes. Container images become containers at runtime. Containers are thus an abstraction of the application layer (meaning that each container simulates a different software application). Though each container runs isolated application, multiple containers can share a common operating system, for example by being launched within the same virtual machine.

In contrast, virtual machines are an abstraction of the hardware layer (meaning that each virtual machine simulates a physical machine that can run software). Virtual machine technology can use one physical server to run the equivalent of many servers (each of which is referred to as a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

A service provider network may manage large fleets of VM instances, which may be simulations of physical machines, such as a workstation or a server, that run on hosts that support virtualization. Each VM instance that is allocated or designated for a user may store a container, or a portable software environment for applications (or other software) to easily run and scale to process a request from a user. These containers may be portable in that they are capable of being migrated between VM instances. In some examples, a single VM instance may include one container that executes software or applications to process requests received for a user account. However, in some examples a VM instance may contain multiple containers to process multiple requests depending on the VM instance.

As mentioned above, the techniques described herein may provide automated, partially automated, or assisted containerization of applications. In particular, users may begin containerization of their legacy applications as the first step towards modernization of their systems. Such modernization may reduce their operation overhead and compute cost, increase development and deployment agility, and provide standardization of builds across the user's systems. Users may perform modernization to resolve a technical debt and leverage modern technologies to create new customer experiences. However, such efforts, including efforts to containerize applications may stall due to various problems, such as the example problems discussed below.

First, legacy applications may be monolithic, hugely intertwined with complex application interdependency developed over a period of time and oftentimes, may be poorly documented. Many times, these legacy applications may be co-hosted in the same environments and without modern isolation and security considerations. As such, changes to one legacy application may negatively affect other applications despite appearing to be unrelated. Similarly, when migrating such legacy applications to cloud services, application interdependencies may create difficulties when poorly understood, for example, due to lack of documentation and loss of expertise.

Second, users may have limited technology budgets and have to allocate funds between developing new systems and modernizing existing systems. However, in many cases, the allocation of funds may heavily favor developing new systems and functionalities while the modernization budget is neglected. For example, users tend to prioritize delivering new capabilities in both legacy and new applications to respond to changing business requirements. Because of this, while users wish to invest time and resources to upgrade their legacy applications, funding realities slow progress.

Moreover, a technical expertise mismatch may develop within the IT departments of users. For example, one set of users may have IT departments with technical expertise with modern technologies while lacking expertise and skills relating to legacy applications. Similarly, another set of users may have expertise with legacy applications and related technologies but may lack expertise with respect to more modern technology. For instance, an IT department may have failed to retrain and acquire skillsets related to such modern technologies.

The techniques and systems described herein may provide functionality that may automate or assist in containerizing applications while handling the complex interdependencies of legacy applications. Such an automated tool may make the modernization easier and quicker than the huge manual efforts otherwise needed.

In some embodiments, numerous applications, each made up of a collection of processes, may be operating on the user's on-premise system. As used herein, a user's on-premise systems may include software operating on servers or other computing hardware located are the user's physical location (e.g. VMs operating on one or more servers on the user's premises). In some examples, the on-premise system may be a production system of the user. For example, the on-premise system may be the production system with which, for example, the user's customers or employees interact in the course of the user's business operations.

To generate a containerized version of a particular application, multiple cooperating processes of the particular application may be identified and selected for inclusion in the containerized version of that particular application. This may represent a challenge because, as discussed above, many legacy applications are the result of piecemeal development over long periods of time with poor documentation. As such, the processes operating on the user's on-premise system may not necessarily be known to belong to a specific application.

Moreover, to containerize an application that includes multiple cooperating processes (e.g. cooperating by information sharing, scaling, modularity, load sharing purpose, etc.), the process interrelationships may have to be preserved. However, as discussed above, technical talent mismatches and budget constraints may make the discovery of the processes of an application and the determination of the relationships among those processes time consuming, operationally difficult, and costly. The automated discovery tool disclosed herein may allow for the processes of the particular application to be identified despite the myriad of processes not having well defined application boundaries. Further, the automated discovery tool may provide functionality to discover the interrelationships between the processes of an application and for those relationships to be maintained in the containerized version of the application.

Second, once the processes belonging to the application to be containerized have been identified and their relationships have been determined, the techniques and systems described herein may provide functionality for the dependencies of the identified processes (e.g. such as the files, binaries, libraries, network and system calls of the processes) to be determined and included in the container. Two example embodiments of processes for identifying and including the dependencies in the container are provided and discussed.

In the first example, the containerization service causes a snapshot of the existing in-production applications to be taken and uploaded the containerization service. The snapshot includes at least two parts, an application template and a filesystem tarball or other filesystem archive or filesystem image file which may exclude system and kernel files (referred to herein generally as a filesystem image). Additional discussion of the snapshot approach is provided below with regard to the FIGS. 5 and 6. Generally, the application template may provide static metadata information about each process. Once the snapshot is uploaded to the containerization service, the service may unpack the filesystem tar ball, start a sandbox workflow, and operate the sandbox based on the application template, monitor the behavior of the sandbox and generate a report regarding the dependencies observed by the monitoring. In some example embodiments, once the monitoring has reached a threshold time or threshold stability, the containerization service may utilize the resulting set of dependencies and observed behavior to build a container image for the containerized application.

In the second example, the containerization service may forego a snapshot of the existing in-production applications. Instead, the executable files of the application may be sandboxed along with metadata such as the application template but without additional dependency files. Once the sandbox has been setup, the sandbox workflow may be initialized and operated while the containerization service monitors the behavior of the sandbox. When a fault regarding a dependency is observed by the monitoring (e.g. when the monitored processes fault when attempting to access a file not currently stored in the container), the containerization service may operate to retrieve the missing item from, for example, the existing in-production applications. In some example embodiments, once the monitoring and retrieval of missing items in response to faults has reached a threshold time or threshold stability, the containerization service may build a container image for the containerized application based on the resulting set of dependencies and observed behavior of the processes of the containerized application.

While the techniques described herein are with reference to containers operating on VM instances, the techniques are equally applicable to any type of computing resource that has multiple instances or occurrences for processing concurrent commands or requests. For example, the techniques are equally applicable to a messaging service that receives messages, stores them in a queue, and processes concurrent requests for user accounts to retrieve and send those messages to other devices.

Additionally, while the examples herein discuss the migration and containerization of legacy applications operating on the user's on-premise systems, implementations are not so limited. For example, the techniques provided herein for automated, partially automated, or assisted containerization of applications may be utilized in embodiments in which the legacy applications may be operating in a service provider network without containerization (e.g. in one or more VMs operating on computing resources of a service provider network).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a flow diagram of an example method 100 performed by a service provider network to containerize an application in accordance with some embodiments herein. More particularly, the illustrated flow diagram shows the general operations of an example containerization method 100 occurring in two phases, a discovery phase (e.g. operations 102-110) and a containerization phase (e.g. operations 112-116).

At 102, a containerization service collects information from the user (e.g. in response to the containerization request). For example, the containerization service may present a questionnaire or similar interface to the user. In some examples, the questionnaire may request relationship information about processes of the application to be containerized. As discussed above, applications may have multiple cooperating processes. To containerize these applications, each process of the application must be migrated while preserving the process interrelationships. Generally, a user may not have sufficient knowledge about how the application was constructed and how the processes work cooperatively to directly specify the process interrelationships. Instead, the questionnaire may request the user provide whatever information available to aid the containerization service in a subsequent automated or partially automated determination of the cooperating processes and relationship information associated with the cooperating processes. For example, the user may be asked which of a plurality of factors indicating a pair of processes are cooperating processes the user knows are present in the application to be containerized. For example, the user may know that one or more parent-child process relationships are present between processes of the application to be containerized.

At 104, the containerization service may examine the user's system (e.g. VMs operating on one or more on-premises servers) obtain a list of processes on the user's system and generate metadata for the application or applications being executed. For example and as discussed in more detail below, the containerization service may request a process list from a monitoring agent (containerization agent or "agent") installed on the user's system. The agent may request the process list from the operating system on the user's system as well as information about the processes relevant to determining process relationships. The agent may return the process list and information to the containerization service.

In addition, the containerization service may identify cooperating process pairs. In some examples, the containerization service may utilize the user's responses to the questionnaire to select or configure a process relationship detection algorithm for the target application with different weights on one or more factors. In some examples, factors the user indicated were present in the cooperating processes of the application to be containerized may be given higher weights. In some examples, a process relationship detection algorithm may utilize the information about the processes to determine which of a plurality of factors are present for the process pair. The relationship scores for the pairs of processes may be determined based on which factors are present and the weighting given to each present factor (e.g. equal to the sum of the weights of factors present for the process pair). For example, a parent-child relationship may have a weight of five (5) while the occurrence of simple interprocess communication (IPC) between two processes, for example, using a SIGUSR1 signal, may have a weight of one (1). A process pair having both of the factors present (e.g. one process is parent to the other and the processes communicated using a SIGUSR1 signal), a process relationship detection algorithm may give the process pair a relationship score of six (6). Any number of potential factors may be utilized and the configuring of the process relationship detection algorithm may vary based on the implementation. For example, in some implementations, the user may explicitly include or exclude specific factors, and may leave other factors unknown if the user is not sure. In such an implementation, based on user's questionnaire input, the containerization service may exclude the specified factors, and determine the weights for the specifically included and unknown factors. Additional discussion of the determination of cooperating processes and relationship information is provided below with regard to FIGS. 3 and 4.

Depending on the implementation, the examination of the user's system may be performed on-demand for the current state of the user's system or as an ongoing monitoring process over a period of time. In some implementations, an initial on-demand examination of the current state of the user's system may be captured and further monitoring may be performed after analysis of the current state.

An application definition may be created at 106. In general, an application definition may be a list of processes to be included in the containerized application and the interrelationship of those processes and may include other configuration information or metadata such as a list of dependencies. For example, the user may utilize a list of processes discovered on the user's system and information about the interrelationships of the processes to create an application definition listing the processes to be containerized to form the desired application along with any needed libraries.

At 108, the containerization service may perform an analysis of the user's system based on the application definition. In particular, the analysis may detect additional processes not already included in the application definition as well as detect dependencies for the processes, such as the files, binaries, libraries, network and system calls of the application on the user's system. In some implementations, a snapshot of the user's system may be operated in a sandbox. As used herein, a sandbox typically provides a set of resources for guest programs to run in and includes tools that allow for many aspects of the execution of the guest programs to be monitored. Further, as used herein, "sandbox" may refer to any tool that replicates at least the minimal functionality needed to accurately execute and monitor the applications and/or other code and processes (e.g. usage of the same environment variables as, or access to an identical database to that used by, the stable prior implementation intended to be modified; there are many other possibilities, as the specific functionality needs vary widely with the nature of the code and the applications for which it is intended). A snapshot may refer the state of a system at a particular point in time. Herein, a snapshot may refer to a copy of the state of a system captured such that a sandbox or similar system may continue operation in the same state as the snapshotted system as if the environment of the sandbox is the same as the snapshotted system. During the operation of the sandboxed snapshot, processes of the application may be monitored to determine additional processes and dependencies of the application being containerized. For example, if a process from the application definition calls a library function of a library that is not included in the application definition, the analysis may determine the library needs to be included in the application definition. Other implementations may not utilize a snapshot of the system and instead retrieve and add dependencies to the sandbox at the time a process executing in the sandbox experiences a fault due to the dependency not being present. Additional discussion of the determination of dependencies is provided below with regard to FIGS. 5 and 6.

At 110, the containerization service may update the application definition based on the analysis at 108. For example, if the analysis detected additional processes to be added to the application at 108, the application definition may be updated to list the additional process. In addition or alternatively, the user may be presented with the results of the analysis and may manually update the application definition. The process may then continue to 112 or return to 108 for additional analysis. For example, if an additional process is added to the application at 110, the containerization service may return to 108 for additional analysis to determine if the additional process has additional related processes or additional dependencies that need to be included in the containerized application. Otherwise, the containerization service may perform an update of the containerization configuration at 112 based on the final application definition. In some examples, the containerization configuration may set forth information for the running of the produced containerized application, such as the amount of memory needed, the number of instances of the processes that should be executed, the port numbers that should be used, and so on.

Optionally, the user may be presented with a report of the final application definition and containerization configuration and be provided with an opportunity to make manual changes via a UI. For example, the user may update the application definition to modernize both the legacy software components and middleware to be included in the container. For example, the user may specify or provide updated software binaries from a Continuous Integration and Continous Delivery (CI\CD) pipeline. This may allow cause the tools and libraries included in the container image to be updated versions of the components (e.g. upgrading the Java Development Kit (JDK) from 8 to 9, upgrade Tomcat from 8 to 9, and upgrade JBoss Wildfly from 16 to 17). The process then continues to 114.

At 114, based on the application definition and containerization configuration, the containerization service may gather components to build the containerized application. In some examples, the containerization service may request a monitoring agent installed on the user's system provide copies of the components to the containerization service. Example components include executable files, configuration files, libraries, and binaries.

At 116, the containerization service may use metadata (e.g. the application definition and any other information derived from the discovery phase) and the components gathered at 114 together with the containerization configuration to build a container image for the containerized application. Though details are implementation specific, in general, the containerization service may build the container image by generating a standalone, executable package that includes everything needed to run the application including the process executables, dependencies and configuration information (e.g. code, runtime, system tools, system libraries, and settings).

The container image may then be launched and tested. For example, the user may specify test scripts or standard application-specific tests to confirm that the generated container image is functional. An example of an application specific test would be confirmation that a web server is running on the container's IP port. Another example test would be an application test. For example, after the containerization is complete and the application is launched in the service provider network, an application level test may be conducted to make sure all functionality of the application executes as expected.

Once tested, the containerization process may be repeated, in whole or in part, or the container image may be provided to the user (e.g. stored in a storage location of the service provider network associated with the user).

Figure 2:
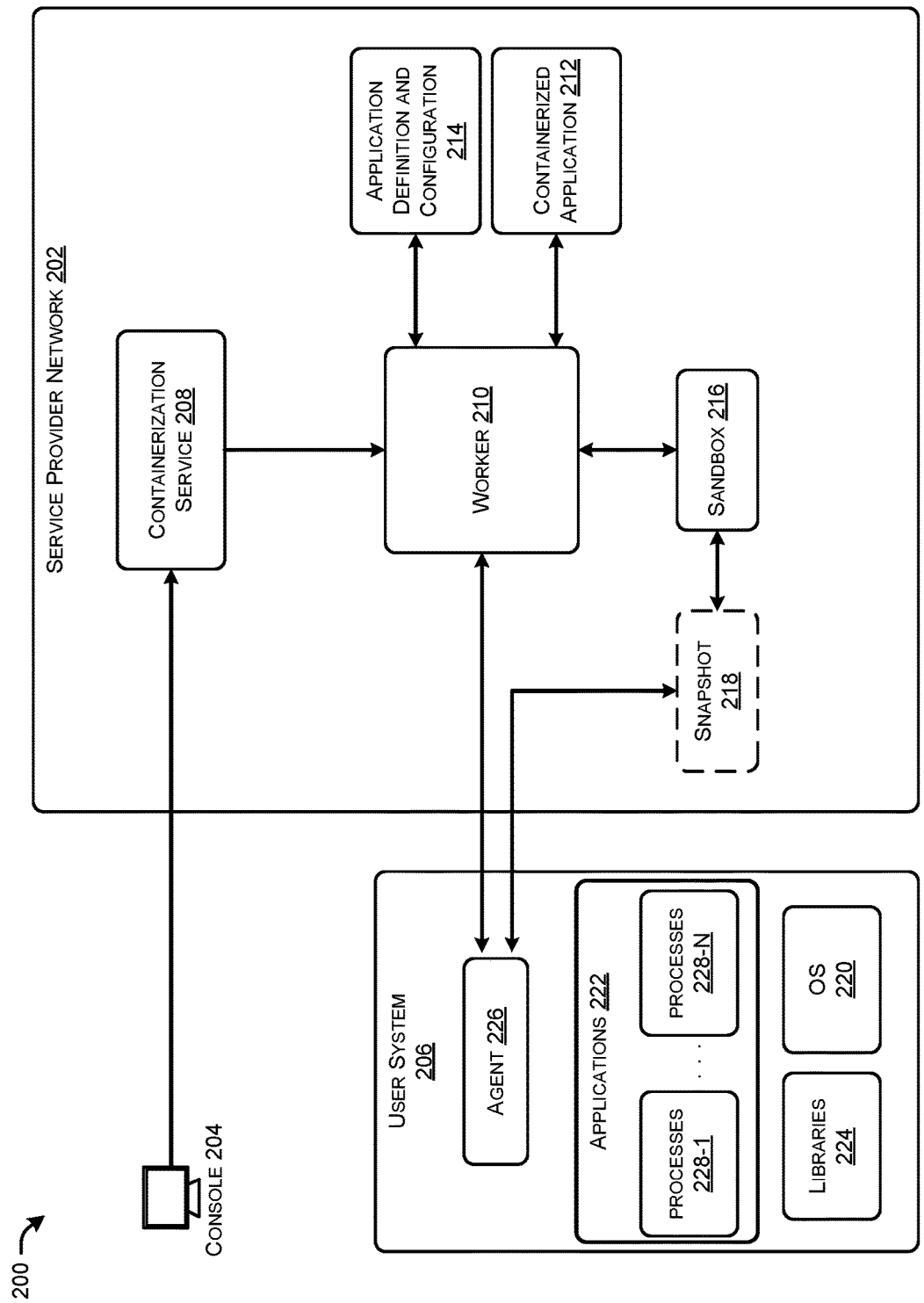
FIG. 2 illustrates a system-architecture diagram of an example environment in which a service provider network may provide for the containerization of applications.

FIG. 2 illustrates a system-architecture diagram of an example environment 200 in which a service provider network 202 may provide for the containerization of applications in accordance with some embodiments. As illustrated, the environment 200 further includes a console 204 and the user system 206.

In summary, the service provider network 202 includes a containerization service 208 that may orchestrate the operation of at least one containerization worker 210 that generates a containerized application 212 based on an application definition 214 and the results of a sandbox 216 analysis. Optionally, the sandbox 216 may utilize a snapshot 218 of the user system 206 in the analysis. Additional discussion of the operation of the worker 210 and the sandbox 216 is provided below with regard to FIGS. 5 and 6.

The user system 206 may include an operating system 220 in which applications 222 may be executed. An operating system (OS) may be system software that manages computer hardware and software resources and provides common services for applications. The applications 222 may utilize computer hardware and software resources through requests or calls to the operating system 220 and one or more libraries 224 on the user system 206. Libraries 224 may be a collection of non-volatile resources used by applications. These may include configuration data, documentation, help data, message templates, pre-written code and subroutines, classes, values or type specifications.

The user system 206 may have a monitoring agent ("agent") 226 installed thereon which interfaces with the containerization worker ("worker") 210. The agent 226 may monitor the operation of the user system 206 to provide information to the containerization service 208 and worker 210 for use in containerizing applications executing on the user system 206. For example, the agent 226 may monitor the processes 228-1-228-N of the applications 222 to provide relationship information between cooperating processes, as well as dependency information.

The console 204 may be a user interface to the containerization service 208 presented on a user device, a hardware device associated with the service provider network or any other computing device. In operation, the console 204 may provide a user with an interface to the containerization service 208. Though the user interface, the user may request containerization of applications executing on the user system 206, provide or modify the application definition and or any other configuration information, and receive status information. Additionally, the console 204 may provide the user with deployment controls that allow the user to deploy a resulting containerized application into use.

The containerization service 208 may operate to orchestrate the discovery and containerization phases of the process 100 discussed above with regard to FIG. 1. More particularly, the containerization service 208 may interact with the user of the console 204 and may control the one or more workers 210 to perform the operations of the discovery and containerization phases of the process 100 to containerize the applications 222. Each worker 210 may be a subordinate process created by the containerization server 208 upon receipt of a containerization request. However, while shown in FIG. 2 as separate entities, the containerization service 208 and the workers 210 may be a single entity in some implementations. In addition, the containerization service 208 or the service provider network 202 may include a database which persists user information, application metadata, and containerization task information.

The worker 210 may generate a containerized application 212 based on the application definition 214 and the results of the sandbox 216 analysis, for example, in the manner discussed above with regard to FIG. 1 and below with regard to FIGS. 5 and 6.

Figure 3:
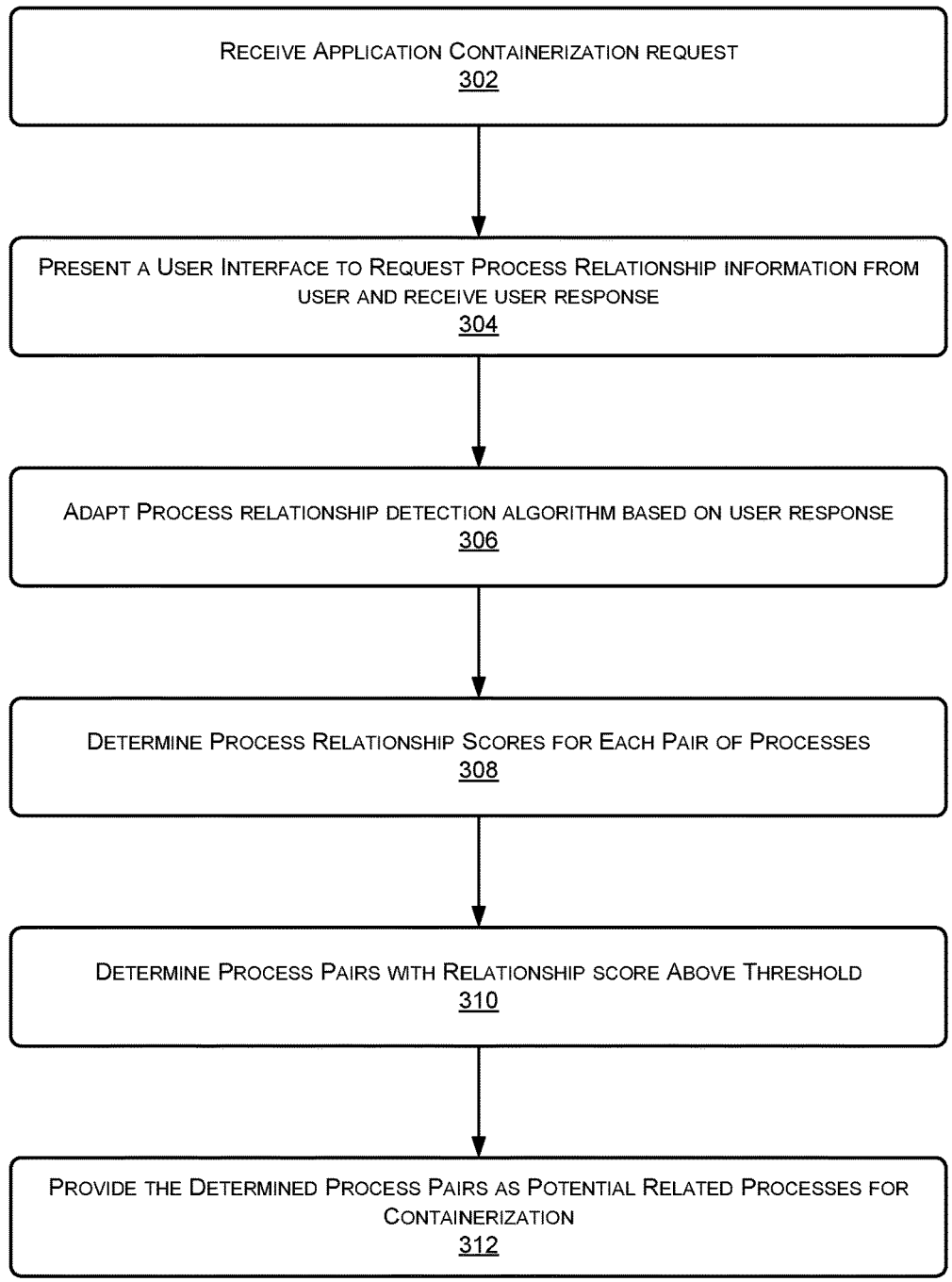
FIG. 3 illustrates a flow diagram of an example process performed by a service provider network for discovering cooperating processes during application containerization

FIG. 3 illustrates a flow diagram of an example method 300 performed by a service provider network for discovering cooperating processes during application containerization according to some embodiments herein.

At 302, the containerization service 208 may receive a containerization request via the console 204. For example, containerization request may designate a user system and initial information about the application to be containerized.

At 304, the containerization service 208 may cause a user interface to be presented by the console 204, which may request process relationship information from a user. As discussed above, in some examples, the requested process relationship information may be factors known to the user that would be indicative of the presence of a cooperating process relationship (e.g. a parent-child relationship). The containerization service 208 may then receive user responses via the user interface presented on the console 204.

At 306, the containerization service 208 may adapt the settings of a process relationship detection algorithm based on the user responses. In some examples, the user responses may be utilized to adjust weights for various factors in determining whether a pair of processes are interrelated. In the context of FIG. 2, the containerization service 208 may then provide the relationship detection algorithm settings to a worker 210 for process relationship detection.

At 308, the worker 310 may analyze information provided by the agent 226 based on the relationship detection algorithm settings and determine a relationship score for each pair processes operating on the user system 206. The relationship score for a pair of processes may be any numerical value, symbol, characters, etc., that indicates how likely the pair of processes are to be cooperating processes of the same application.

At 310, the worker 210 may determine which process pairs have a relationship score equal to or above a threshold, such as a threshold numerical value. At 312, the worker 210 may provide the pairs of processes determined to have a relationship score that is equal to or that is above the threshold to the containerization service 208 as potentially related processes for containerization.

As discussed above with regard to FIG. 1, the containerization service 208 and a user may determine which processes are ultimately selected for containerization based on the information provided by the worker 210. For example, a user may determine that a pair of processes determined to be cooperating processes by the worker 210 and the containerization service 208 were mistakenly determined as such and reject one or more of the processes for containerization.

Additional information regarding a particular implementation of the relationship information questionnaire and a relationship determination process based thereon is provided with regard to FIG. 4.

FIG. 4 illustrates an example questionnaire 400 that may be presented to a user via the console 204 to obtain information for determining cooperating processes during containerization of an application. In an implementation utilizing the illustrated questionnaire 400, the process relationship determination algorithm may utilize a set of weighted factors to determine a score for each process pair. For example, the score may be determined as the sum of the weights of the factors found to be present between the processes of the process pair.

As illustrated, the questionnaire includes four vertical columns, namely, a category column 402, a factor column 404, a weight column 406, and three user response columns 408 (e.g. one each for "yes", "no" and not applicable ("N/A")).

In the illustrated case, the questionnaire 400 includes two categories of factors, a category of factors 410 related to multiple local processes (e.g. potentially cooperating processes operating on a particular server) and a category of factors 412 related to distributed processes (e.g. potentially cooperating processes operating on multiple servers). Each factor may have a weight and one of the user responses in 408 selected. The weights 406 may be dynamically adjusted by the containerization service 202 based on the combination of user responses in 408. For example, a plurality of predefined relationship detection weighting templates may be mapped to different combinations of user responses and automatically selected to adjust the weights 406 once the user has provided responses to the questionnaire via the console 204. Once a template has been selected based on the user responses, the weight column 406 may be populated with the corresponding weights. Alternatively or additionally, a user may override the weights 406 using the console 204.

After receiving the questionnaire responses, the containerization service 208 may configure the relationship detection algorithm or configure the detection process to utilize the determined factor weighting. In some examples, the relationship detection algorithm may utilize a matrix of weighted factors and monitoring data provided by the agent 226 to determine a score for every pair of processes running either locally or distributed on the user system 206. The matrix factors may include whether the process pair have a parent-child or sibling relationship, whether the process pair is associated with the same user or group of users (e.g. have the same userId or groupId), whether a simple interprocess communication signal (e.g. SIGUSR1) was sent from one process to the other, whether a long or short lived network connection was present between the pair of processes, whether the pair share the same cgroups (e.g. are part of the same collection of processes that are bound by the same criteria and associated with a set of parameters or limits on resources such as on memory, IO, CPU or network), whether the pair share the same namespace other than default (e.g. the process are associated with a same namespace and can only see or use the resources associated with that namespace), whether the pair share the same interprocess communication (IPC) (e.g. have the same message queue, shared memory, semaphore, or other mechanisms provided by an operating system to allow the processes to manage shared data), whether the pair share the same local domain socket, whether the pair share the same inode file access, whether the pair share the same executable file (e.g. exefile) and execution parameters, whether the pair share the same running environment variables, whether the pair share the same port numbers in different hosts, and whether the pair share the same technical stack (such as java, ruby, python etc.). These factors are examples and not intended as an exhaustive list. Further, it should be noted that categorization of the factors is not limiting and some factors illustrated in the local processes category may be included in the distributed processes category and vice versa. On the other hand, some factors, such as parent-child relationships (e.g. based on the parent process ID and PID of the processes) may be applicable to one category (e.g. local processes) but not others (e.g. the distributed processes).

As mentioned above, different factors may have different weights. Further, all of the factors may not be used even if answers are collected from the users because, while the user may specify that processes are cooperating if they share IPC communication between each other, this factor cannot be considered if there is no network connection.

In some examples, the relationship determination may be a best effort rather than a definite result. Some examples of how the factors may be used are as follows. A pair of processes may be identified as cooperating processes when they share local IPC communication and the same inode file access because the pair are mostly likely cooperating processes running for the same application on the local host. Similarly, a pair of processes may be identified as cooperating processes when they have long live or short live TCP connection between each other because they are most likely cooperating processes running for same application in a distributed cluster. Further, a pair of processes may be identified as cooperating processes when the pair run in the same cgroup and same namespace because that may be a strong signal those processes are best suited to operate in a single container. Finally, a pair of processes may be identified as cooperating processes when the processes use the same execution binary and port number because they are most likely different instances of the same application that were spun off for load sharing purposes. For example, as a load on an instance of a process increases, a second instance of the process may be initialized on a second server to share the load with the first instance. In such a case, the processes may share the same execution binary and port number but be located on two different servers.

Using the weighted factors and monitoring information, worker 210 may compare each of the two processes and determine a relationship score. If the score is below a predefined threshold, the two processes may be determined to be independent (e.g. not cooperating processes that need to be containerized together with an intact relationship to properly function). On the other hand, if the score is equal to or above the predefined threshold, the two processes may be determined to be cooperating processes for one application (e.g. processes that need to be containerized together with an intact relationship to properly function).

The cooperating process relationship may be considered transitive. In other words, because the relationship is transitive, if A and B are determined to be cooperating processes and B and C are determined to be cooperating processes, A and C will be cooperating processes as well, even if A and C were otherwise determined to be independent.

Implementations are not limited to the above described determination. For example, process-centric relationship scores may be used in addition or as an alternative. For example, the Jaccard similarity algorithm could be used to measure the similarity between processes. The Jaccard similarity algorithm may be defined as the size of the intersection divided by the size of the union. Another example may use the cosine similarity algorithm. The resulting cosine similarity may be from −1 to 1, where −1 means diametrically opposed; 1 means completely similar; and 0 means orthogonal and uncorrelated. However, in some implementations, the value of the resulting cosine similarity may be from 0 to 1, with no negative value cases. Examples of these scoring determinations are set forth below.

For both the Jaccard similarity algorithm and the cosine similarity algorithm, the factors of each process may be computed and mapped to a process vector.

For the following examples, the following example process information is used:

Process A:
PID: 567 ParentPID: 234
TCP: Local address ip1, local port port1, remote address ip2, remote port port2
Process B:
PID: 568 ParentPID: 789
TCP: Local address ip2, local port port2, remote address ip1, remote port port1
Process C
PID: 569 ParentPID: 234
No TCP connection
Process D
PID: 678 ParentPID: 12
No TCP connection Above, PID is the process ID of the subject process, ParentPID is the process ID of the parent of the subject process and TCP is whether a TCP connection is present for the subject process.

The worker 210 or containerization service may compare process A to processes B, C, and D to determine the process vectors for the similarity algorithms. The process vectors of the example herein include two dimensions: (1) are the processes related as parent-child or siblings; and (2) does the process use a TCP connection.

For the Jaccard similarity algorithm, the preparation of the vectors and computation of the similarity may be as follows: If one dimension does not match between processes, set that dimension in the vector of the compared process to 0. When determining the intersection, if a dimension in the process vectors matches, it is counted.

The similarity of process A to process B may be determined as follows. For dimension 0: Process A and process B are not parent and child, nor siblings. As such, dimension 0 of A's vector is 1 and dimension 0 of B's vector is 0. Similarly, for dimension 1: both processes have a TCP connection. As such, dimension 1 of both vectors is 1 and the process vectors may be:

Process A [1, 1]
Process B [0, 1]
The Jaccard similarity may be computed as:

$$J(A,B)=|A \cap B|/(|A|+|B|-|A \cap B|)$$

For A and B, the size of the intersection of A and B ($|A \cap B|$) is 1 (e.g. one matching dimension) and the size of each of A and B is 2. As such:

$$J(A,B)=1/(2+2-1)=\tfrac{1}{3}=0.33$$

The similarity of process A to process C may be determined as follows. For dimension 0: Process A and process C are not parent and child but they are siblings (e.g. same ParentPID). As such, dimension 0 of A's vector is 1 and dimension 0 of C's vector is 1. For dimension 1: Process C does not have the dimension of TCP connection. As such, dimension 1 of C's vector may use X to stand for nothing and the process vectors may be:

Process A [1, 1]
Process C [1, X]
The Jaccard similarity may be computed as:

$$J(A,C)=|A \cap C|/(|A|+|C|-|A \cap C|)$$

For A and C, the size of the intersection of A and C ($|A \cap C|$) is 1 (e.g. one matching dimension) and the size of A is 2 and the size of C is 1. As such:

$$J(A,C)=1/(2+1-1)=\tfrac{1}{2}=0.5$$

The similarity of process A to process D may be determined as follows. For dimension 0: Process A and process D are not parent and child, nor siblings. As such, dimension 0 of A's vector is 1 and dimension 0 of D's vector is 0. For dimension 1: Process D does not have the dimension of TCP connection. As such, dimension 1 of D's vector may use X to stand for nothing and the process vectors may be:

Process A [1, 1]
Process D [0, X]
The Jaccard similarity may be computed as:

$$J(A,D)=|A \cap D|/(|A|+|D|-|A \cap D|)$$

For A and D, the size of the intersection of A and D ($|A \cap D|$) is 0 (e.g. one matching dimension) and the size of A is 2 and the size of D is 1. As such:

$$J(A,D)=0/(2+1-0)=0/3=0$$

In an example in which a 0.33 relationship threshold is used with the Jaccard similarity, the worker 210 or containerization service may determine that processes B and C are cooperating processes to process A and process D is not.

For the cosine similarity algorithm, the preparation of the vectors is similar but involves an additional operation of multiplying each dimension of the process vectors by the weight assigned to the corresponding factor (if the dimension is not present (e.g. X), a zero is utilized). In an example in which the weight assigned to the parent-child or sibling dimension is one (1) and the weight for a TCP connection is five (5), the process vectors for comparison of process A to each of processes B, C and D:

Process A [1, 5]
Process B [0, 5]
Process C [1, 0]
Process D [0, 0]

The cosine similarity may be the cosine of the angle between two n-dimensional vectors in an n-dimensional space. More particularly, it may be the dot product of the two vectors divided by the product of the two vectors' lengths (or magnitudes). This may be computed using the following formula:

$$\text{similarity}(A, B) = \frac{A \cdot B}{\|A\| \times \|B\|} = \frac{\sum_{i=1}^{n} A_i \times B_i}{\sqrt{\sum_{i=1}^{n} A_i^2} \times \sqrt{\sum_{i=1}^{n} B_i^2}}$$

As such, the cosine similarity for processes A and B may be:

$S(A,B)=(A \cdot B)/|A| \times |B|=(1*0+5*5)/5.099*5=0.98$

The cosine similarity for processes A and C may be:

$S(A,C)=(A \cdot C)/|A| \times |C|=(1*1+5*0)/5.099*1=0.19$

The cosine similarity for processes A and D may be:

$S(A,D)=(A \cdot D)/|A| \times |D|==(1*0+5*0)/5.099*0=0$ (e.g. avoid divide zero)

In an example in which a 0.33 relationship threshold is used with the cosine similarity, the worker 210 or containerization service may determine that process B is a cooperating process to process A and processes C and D are not.

Using the above described relationship detection process, many relationships can be detected and handled for containerization. Example applications with complex process relationships that can be detected may include:

- an application deployed on multiple hosts for load sharing purposes with the same executable file, execution parameters, or port number;
- a distributed application deployed with components on multiple hosts, having network connection long lived or short lived between each other;
- an application deployed on a single host with multiple processes, communicating each other through IPC, signal, domain socket, or network connection;
- an application deployed on a single host with multiple processes, which are in the same cgroup, namespace, or in the same process group and session;
- an application deployed on a single host with multiple processes, which access the same file and are sibling or parent-child relationship; and
- an application deployed on a single host with multiple processes, which have the same exefile, parameters and running environment variable for load sharing.

As discussed above, the relationship detection process may be subject to review by the user of console 204 and additional passes through the detection algorithm may be requested following adjustments of the factors.

Further, as discussed above regarding FIG. 1, once the related processes have been determined, an application definition may be created which, among other information, may specify the processes to be containerized to form the desired application. The application definition may then begin a deep analysis to determine components and dependencies that may be needed for the application containerization.

Specifically, for each individual process included in the containerized application, the worker may identify all dependencies, such as the files, binaries, libraries, network and specific system calls.

While a static analysis of running process could identify opened files that have not yet been closed and libraries currently loaded and that have not yet been unloaded, dynamic behavior is difficult to identify using a static analysis. For example, dynamic behaviors, such as when a process opens a configuration file, reads the configuration file and closes the file may not be detected if the static analysis occurs after the file is closed. Any number of dynamic activities are similarly difficult to detect such as when a process sends a packet using a dynamically opened and closed port.

In some embodiments herein, a sandbox is used to provide dynamic dependency analysis. In network security, sandboxes may be used to do analyses on untested, untrusted, or unverified applications. In such use cases, sandboxes provide a way to dynamic analysis of the application and monitor the system calls, memory and register changes to identify malware.

In embodiments according to this disclosure, sandboxes may be used to perform dynamic analysis of one or more applications (e.g. the processes of the applications) to identify file, network, memory, and system dependencies. In some examples, the sandbox analysis may be performed for each process.

Figure 5:
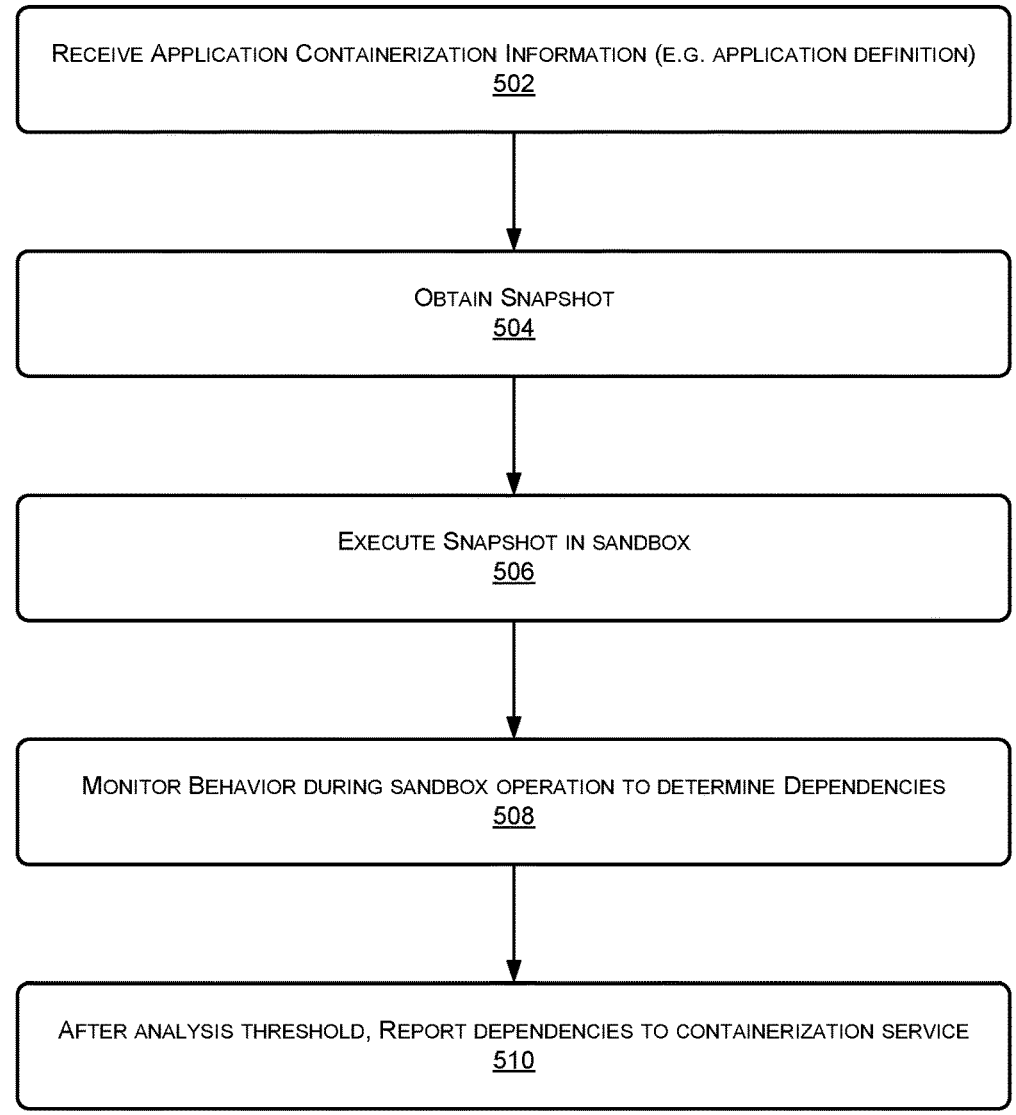
FIG. 5 illustrates a flow diagram of an example process performed by a service provider network for determining components and dependencies that may be used to containerize an application.
Figure 6:
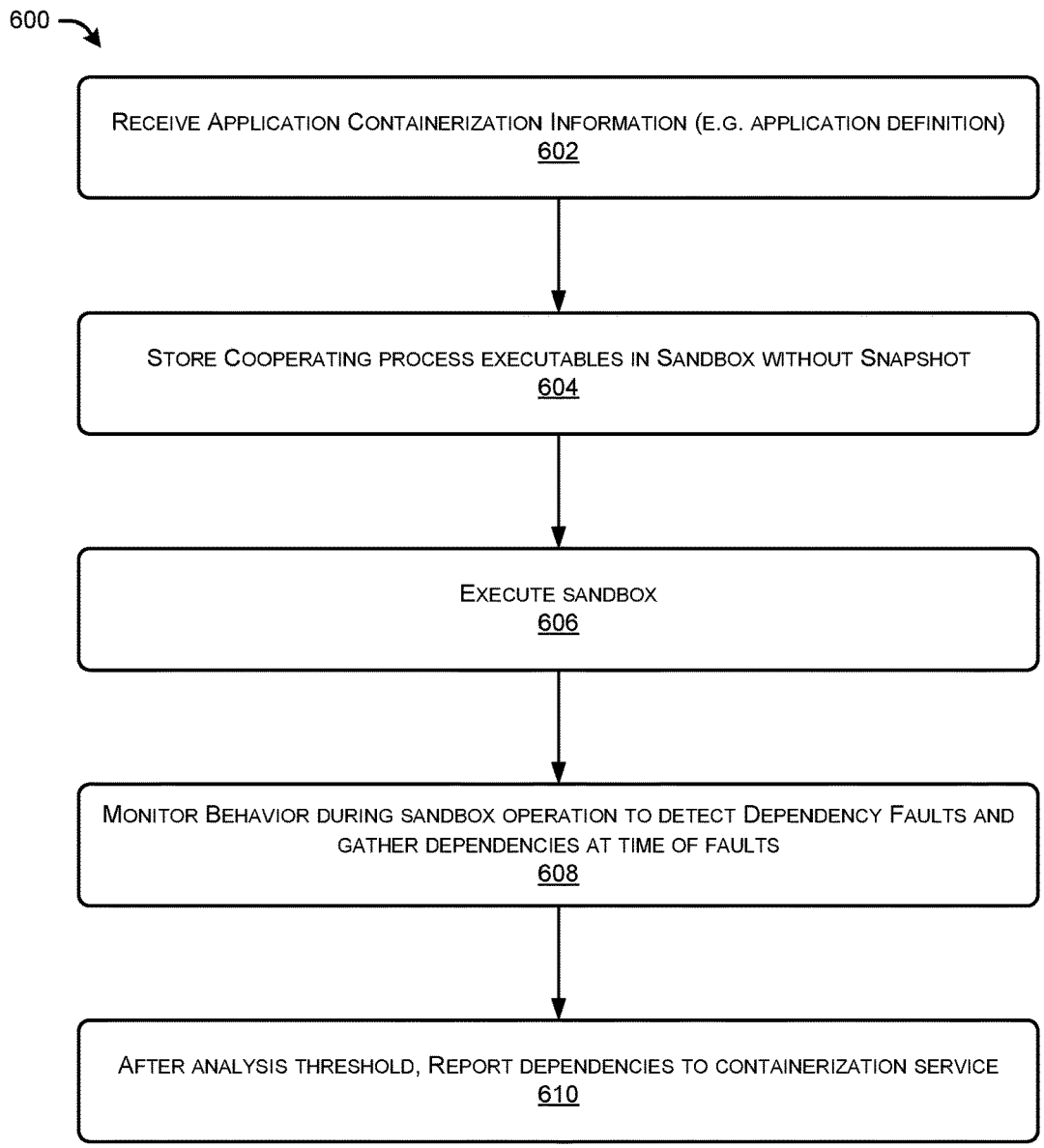
FIG. 6 illustrates a flow diagram of an example process performed by a service provider network for determining components and dependencies that may be used to containerize an application.

FIGS. 5 and 6 each illustrate an example process for dynamic dependency identification using sandboxing. In particular, in the process of FIG. 5, a filesystem snapshot is utilized while the process of FIG. 6 foregoes the use of a snapshot.

FIG. 5 illustrates a flow diagram of an example method 500 performed by a service provider network for determining components and dependencies that may be used for the application containerization according to some embodiments herein.

At 502, a worker 210 may receive application containerization information, such as an application definition related to an ongoing containerization. At 504, the worker 210 may instruct an agent 226 to create a snapshot of the user system 206 and the snapshot may be stored at 218 of the cloud network provider 202.

The snapshot 218 may include two parts, an application template and a filesystem tar ball or image (e.g. excluding the system and kernel files). The application template may be used to describe the static metadata information about the target process, such as:

Operating system (OS) type and version
Central Processing Unit (CPU)
Memory
Environment variables
Parameters
Listening ports
Classpath (e.g. the location of user-defined classes and packages)
Version of the tech stack
Application name The filesystem tar ball may exclude the system binaries, directories, and kernel related images, but include any other files included on the user system 206. As such, the tar ball may be very large. However, for each individual process to be analyzed, the information needed for the analysis is included.

Once the snapshot has been obtained and stored at 218, the containerization service 208 may initialize operation of the sandbox 216 at 506. Specifically, the worker 210 may be instructed to unpack the snapshot files and execute the application being containerized with the environment variables and parameters in the application template.

Next, at 508, the sandbox 216 and worker 210 may monitor the behavior of each process of the application definition. After an analysis threshold (e.g. a period of time, a degree of test cases, etc.), the sandbox 218 and worker 216 may report the detected dependencies to the containerization service.

The examples of information reported include: file operations; network operations; memory operations; IPC operation; libraries utilized; and so on. With this report, the containerization service 208 can determine the files needed for the container, network ports opened and closed dynamically, IPC mechanisms used, memory peak usage, which libraries were dynamic loaded, and so on.

Example file operations include new file, open file, close file, delete file, rename file, write file, and read file. Some example network (socket) operations include new, bind, accept, read, write, and close. Example memory operation included in the report are allocate memory and free memory operations. Some example IPC operations that may be included in the report include attach, detach, create and delete. Finally, some example library operations that may be included in the report include the load library and unload library operations.

As mentioned above, the reported dependencies may be used to build the containerized application. For example, based on the sandbox report and application template information, the container image may be built along with a task definition that includes accurate memory and CPU requirements. The container image may then be deployed to the cloud network for operation.

FIG. 6 illustrates a flow diagram of an example method 600 performed by a service provider network for determining components and dependencies that may be needed for the application containerization according to some embodiments herein. As mentioned above, method 600 differs from method 500 at least in that a filesystem snapshot is not used.

At 602, a worker 210 may receive application containerization information, such as an application definition related to an ongoing containerization.

At 604, the worker 210 may instruct an agent 226 to obtain and store the executable files of the target application in a sandbox 216 of the cloud network provider 202 without a snapshot. In addition, an application template similar to that discussed above regarding FIG. 5 may be generated and provided to the sandbox 216.

Once the executable files have been obtained and stored at 216, the containerization service 208 may initialize operation of the sandbox 216 at 606. Specifically, the worker 210 may be instructed to execute the application being containerized with the environment variables and parameters in the application template.

Next, at 608, the sandbox 216 and worker 210 may monitor the behavior of each process included in the application definition in the sandbox. In the dependency analysis of method 600, the sandbox 216 may detect dependency faults (e.g. the monitored processes faults when attempting to access a file not currently stored in the sandbox). When a fault regarding a dependency is observed by the sandbox 216, the worker 210 may operate to request the missing item from the agent 226. The agent 226 may then retrieve the requested item from, for example, the existing in-production applications.

At 610, after an analysis threshold, (e.g. once the monitoring and retrieval of missing items in response to faults has reached a threshold time or threshold stability), the worker 210 and sandbox 216 may report the detected dependencies to the containerization service 208.

Subsequently, the reported dependencies may be used to build the containerized application. In some examples, the worker 210 and sandbox 216 may be instructed to build a container from the files that have been retrieved at the end of the analysis. In other examples, based on the sandbox report and application template information, the container image may be built using the file list and newly retrieved versions of the listed files.

Once built, the container image may be tested and, if the tests are successful, the image may be deployed to the cloud network for operation. Alternatively, the sandbox analysis may be repeated if the container image fails the test or experiences problems once deployed.

Figure 7:
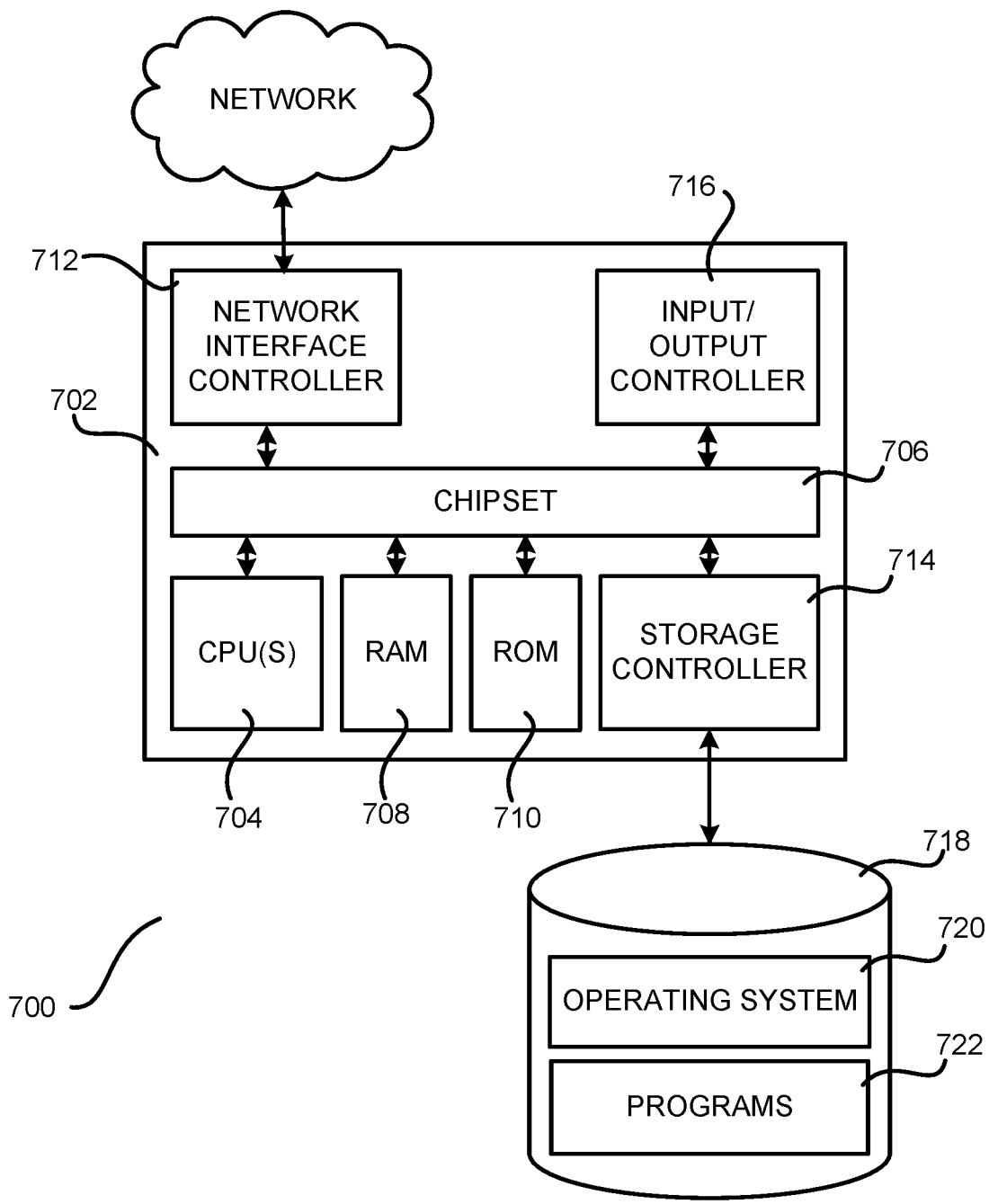
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and may be utilized to execute any of the software components presented herein. For example, each of the console 204, cloud network provider 202, and user system 206 may include one or more computers 700 that implement the above described functionality.

The computer 700 includes a baseboard 702, or "motherboard," which is a printed circuit board to which a multitude of components or devices may be connected by way of a system bus or other electrical communication paths. In one illustrative configuration, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the external network 502 or the local area network 608. The chipset 706 may include functionality for providing network connectivity through a NIC 712, such as a gigabit Ethernet adapter. The NIC 712 is capable of connecting the computer 700 to other computing devices over the networks 502, 608. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store an operating system 720, programs 722, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store information in a non-transitory fashion.

For purposes of the claims, the phrase "computer storage medium" and variations thereof, does not include waves, signals, and/or other transitory and/or intangible communication media, per se, and specifically excludes interpretations thereof which are prohibited by applicable statutory and case law.

As mentioned briefly above, the mass storage device 718 may store an operating system 720 utilized to control the operation of the computer 700. According to an example configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 718 may store other system or application programs and data utilized by the computer 700.

In an example configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states. According to an example configuration, the computer 700 has access to computer-readable storage media storing computer-executable instructions which, when executed by the computer 700, perform the various processes described above. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Moreover, various portions of the containerization techniques discussed herein may be utilized separately from other portions. For example, some implementations may utilize the cooperating process determination technique discussed above without the dependency detection techniques discussed above or vice versa. Other variations are possible.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more first processors; and
one or more computer-readable media storing computer-executable instructions that, when executed by the one or more first processors, cause the one or more first processors to:
receive a request for a containerized version of an application executing on an on-premise user system that includes one or more second processors executing the application;
install a monitoring agent on the on-premise user system executing the application to be containerized;
determine an application definition including one or more processes in a list of processes, the one or more processes to be included in the containerized version of the application;
prepare a sandbox that includes one or more executable files of the one or more processes;
initialize the sandbox; and
for each particular process of the one or more processes:
monitor first execution of the particular process in the sandbox;
select one or more dependencies of the particular process to be components of the containerized version of the application;
add, to the list of processes and based on the one or more dependencies and an interrelationship of the one or more processes, one or more additional processes selected for inclusion in the containerized version of the application;
determine that second execution of the one or more additional processes is to include, as one or more additional dependencies, one or more additional components; and
generate the containerized version of the application using the components and the one or more additional components.

2. The system of claim 1, wherein preparing the sandbox comprises:
generating a filesystem image of the on-premise user system;
generating an application template that includes static metadata information about the one or more processes; and
initializing the sandbox from the filesystem image using the static metadata information.

3. The system of claim 1, wherein:
preparing the sandbox comprises:
obtaining one or more executable files of the one or more processes; and
initializing the sandbox from the one or more executable files, and
wherein monitoring the first execution of the particular process comprises:
during the first execution of the particular process, detecting a dependency fault associated with a dependency being absent from the sandbox; and
adding a dependency associated with the dependency fault to the sandbox.

4. The system of claim 3, wherein the adding the dependency associated with the dependency fault to the sandbox is performed by requesting the dependency from the monitoring agent in response to detection of the dependency fault.

5. A computer-implemented method comprising:
determining one or more processes in a list of processes, the one or more processes to be included in a containerized version of an application;
preparing a sandbox including one or more executable files of the one or more processes;
initializing the sandbox;
monitoring execution of a particular process of the one or more processes in the sandbox to determine one or more dependencies of the particular process;
selecting the one or more dependencies of the particular process to be components of the containerized version of the application; and
adding, to the list of processes and based at least in part on an interrelationship of the one or more processes, one or more additional processes selected for inclusion in the containerized application.

6. The computer-implemented method of claim 5, further comprising performing the monitoring and the selecting for each process of the one or more processes.

7. The computer-implemented method of claim 5, further comprising:
selecting the one or more additional processes for inclusion in the containerized version of the application based at least in part on the one or more dependencies; and
determining additional dependencies of the one or more additional processes to be additional components of the containerized version of the application.

8. The computer-implemented method of claim 6, further comprising
obtaining the components of the containerized version of the application, the components including executable files of the one or more processes and dependencies of each process of the one or more processes; and
generating the containerized version of the application using the components.

9. The computer-implemented method of claim 5, wherein preparing the sandbox comprises:
generating a filesystem image of an on-premise user system including one or more processors executing the application;
generating an application template that includes static metadata information about the one or more processes; and
initializing the sandbox from the filesystem image using the static metadata information.

10. The computer-implemented method of claim 5, wherein:
preparing the sandbox comprises:
obtaining one or more executable files of the one or more processes; and
initializing the sandbox from the one or more executable files, and
wherein monitoring the execution of the particular process comprises:
during the execution of the particular process, detecting a dependency fault associated with a dependency being absent from the sandbox; and
adding a dependency associated with the dependency fault to the sandbox.

11. The computer-implemented method of claim 10, further comprising installing a monitoring agent on a system executing the application, wherein the adding the dependency associated with the dependency fault to the sandbox is performed by requesting the dependency from the monitoring agent in response to detection of the dependency fault.

12. The computer-implemented method of claim 5, wherein the determining the one or more processes to be included in the containerized version of the application comprises receiving a user selection of the one or more processes to be included in the containerized version of the application via a console accessible via a computing device of a user.

13. A system comprising:
one or more processors; and
one or more computer-readable media storing computer-executable instructions that, when executed by the one or more processors, cause the one or more processors to:
  determine one or more processes in a list of processes, the one or more processes to be included in a containerized application, wherein the containerized application is a containerized version of an application;
  prepare a sandbox including at least executable files of the one or more processes;
  initialize the sandbox;
  monitor execution of a particular process of the one or more processes in the sandbox to determine one or more dependencies of the particular process;
  select the one or more dependencies of the particular process to be components of the containerized application; and
  add, to the list of processes and based at least in part on an interrelationship of the one or more processes, one or more additional processes selected for inclusion in the containerized application.

14. The system of claim 13, comprising further instructions that, when executed by the one or more processors, cause the one or more processors to perform the monitoring and selecting for each of the processes.

15. The system of claim 13, comprising further instructions that, when executed by the one or more processors, cause the one or more processors to:
  select the one or more additional processes for inclusion in the containerized version of the application based at least in part on the one or more dependencies; and
  determine additional dependencies of the one or more additional processes to be additional components of the containerized version of the application.

16. The system of claim 14, comprising further instructions that, when executed by the one or more processors, cause the one or more processors to:
  obtain the components of the containerized version of the application, the components including executable files of the one or more processes and dependencies of each process of the one or more processes; and
  generate the containerized version of the application using the components.

17. The system of claim 13, wherein preparing the sandbox comprises:
  generating a filesystem image of an on-premise user system including one or more processors executing the application;
  generating an application template that includes static metadata information about the one or more processes; and
  initializing the sandbox from the filesystem image using the static metadata information.

18. The system of claim 13, wherein:
preparing the sandbox comprises:
obtaining one or more executable files of the one or more processes; and
initializing the sandbox from the one or more executable files, and
wherein monitoring the execution of the particular process comprises:
  during the execution of the particular process, detecting a dependency fault associated with a dependency being absent from the sandbox; and
  adding a dependency associated with the dependency fault to the sandbox.

19. The system of claim 18, comprising further instructions that, when executed by the one or more processors, cause the one or more processors to:
  install a monitoring agent on a system executing the application, wherein the adding the dependency associated with the dependency fault to the sandbox is performed by requesting the dependency from the monitoring agent in response to detection of the dependency fault.

20. The system of claim 19, wherein the system is an on-premise user system including one or more system processors executing the application.

* * * * *